United States Patent
DeMattei (10) Patent No.: US 9,424,334 B2
(45) Date of Patent: Aug. 23, 2016

(54) KEYWORD BASED IDENTITY OF MULTI-MEDIA CONTENT FOR MESSAGE

(71) Applicant: TEXTBEATS, LLC, Greensboro, GA (US)

(72) Inventor: Mark Anthony DeMattei, Greensboro, GA (US)

(73) Assignee: TCB ENCORE, LLC, Greensboro, GA (US)

( * ) Notice: Subject to any disclaimer, the term of this patent is extended or adjusted under 35 U.S.C. 154(b) by 334 days.

(21) Appl. No.: 13/712,252

(22) Filed: Dec. 12, 2012

(65) Prior Publication Data

US 2013/0191384 A1 Jul. 25, 2013

Related U.S. Application Data

(60) Provisional application No. 61/569,367, filed on Dec. 12, 2011, provisional application No. 61/260,521, filed on Apr. 5, 2012.

(51) Int. Cl.
*G06F 17/30* (2006.01)
*H04L 12/58* (2006.01)

(52) U.S. Cl.
CPC .......... *G06F 17/30595* (2013.01); *H04L 51/08* (2013.01); *H04L 51/063* (2013.01)

(58) Field of Classification Search
CPC .................... G06F 17/30595; G06F 17/30861; G06F 17/30867; G06F 3/0482; G06F 17/30876; G06Q 30/0631; G06Q 30/0271; G06Q 30/0601; H04L 65/1059; H04L 65/4084; H04L 51/04; H04L 51/32; H04L 51/08; H04L 51/063; H04N 21/4622

USPC .......................................... 707/736
See application file for complete search history.

(56) References Cited

U.S. PATENT DOCUMENTS

| | | | |
|---|---|---|---|
| 7,571,495 | B2 | 8/2009 | Emeth |
| 2004/0117367 | A1* | 6/2004 | Smith ............... G06F 17/30265 |
| 2006/0195506 | A1* | 8/2006 | Deng .................... H04L 51/066 |
| | | | 709/203 |
| 2009/0042622 | A1* | 2/2009 | Tsui ...................... H04M 19/04 |
| | | | 455/567 |
| 2009/0077027 | A1 | 3/2009 | King |
| 2009/0327065 | A1 | 12/2009 | Mayblum |

(Continued)

FOREIGN PATENT DOCUMENTS

| | | |
|---|---|---|
| JP | 2004-118737 A | 4/2004 |
| KR | 10-2006-0125333 A | 12/2006 |
| KR | 10-2008-0078431 A | 8/2008 |

OTHER PUBLICATIONS

PCT Notification of Transmittal of the International Search Report and The Written Opinion of the International Search Authority, or the Declaration, completed on Mar. 15, 2013 and mailed on Mar. 18, 2013 from the Korean Intellectual Property Office.

*Primary Examiner* — Evan Aspinwall
(74) *Attorney, Agent, or Firm* — Smith Tempel Blaha LLC; Gregory S Smith (57) ABSTRACT

A text messaging computer-implemented system is disclosed for providing embedded multi-element (text message and the inclusion of any audio recorded or video recorded) content by authenticating a mobile device compatible with multiple transport technologies (such as 4G and 5G networks) and operable to render a text message with an integrated audio and/or video embedded message within a text message originating from a first mobile device.

2 Claims, 8 Drawing Sheets

(56) References Cited

U.S. PATENT DOCUMENTS

2010/0159883 A1* 6/2010 Pascal .................. H04L 12/581
　　　　　　　　　　　　　　　　　　　　　　455/412.1

2010/0223095 A1* 9/2010 Ranta .................. G06Q 10/109
　　　　　　　　　　　　　　　　　　　　　　705/7.31

* cited by examiner

KEYWORD BASED IDENTITY OF MULTI-MEDIA CONTENT FOR MESSAGE

CROSS-REFERENCE TO RELATED APPLICATIONS

This application claims the benefit of and priority to U.S. Provisional Application No. 61/569,367, filed Dec. 12, 2011 and to U.S. Provisional Application No. 61/260,521, filed Apr. 5, 2012, the contents of both applications being incorporated by reference herein in their entirety.

BACKGROUND

The invention relates to text messaging or instant messaging over mobile devices; and, more particularly, to a system and method for decoding and/or encoding such messages to determine key words therein and select video and/or audio content relating to the key words and transmitting the selected content to the recipient of the text message.

RELATED ART

Text messaging and instant messaging over mobile devices, such as cell phones or wireless tablets, is well known. Generally, the sender types a message into the device and sends it to the intended recipient.

SUMMARY OF THE INVENTION

It is an object of this invention to provide a system and method of decoding and/or encoding text messages or instant messages, consider the content thereof relating to preselected key words in the message, and transmit audio and/or video content relating to the pre-selected key words to the intended recipient of the text message or instant message.

DESCRIPTION OF THE PREFERRED EMBODIMENT

The invention contemplates a computer implemented system (FIG. 8) that can accept a request from a first mobile device for a text message or instant message that is accompanied with an embedded audio and/or video recording associated with at least one word or a plurality of words that are inputted in the text message or instant message. A text messaging or instant messaging user interface is preprogrammed to select recordings from a group of candidate recordings associated with a specified word or plurality of words of the text message or instant message from an appropriate list of audio and/or video recordings stored on a remote server, the internet, the cloud, in memory within the wireless device or in any storage location containing a plurality of audio recordings and/or video recordings that may be accessible by a wireless device. These audio and/or video recordings are retrieved based on a key word or key words input within the body of the text message originating from the first mobile device user's text messaging interface. If the second or group of mobile device users have the system installed on their wireless device, they may also respond back to the first users wireless device using the same interface.

Figure 1:
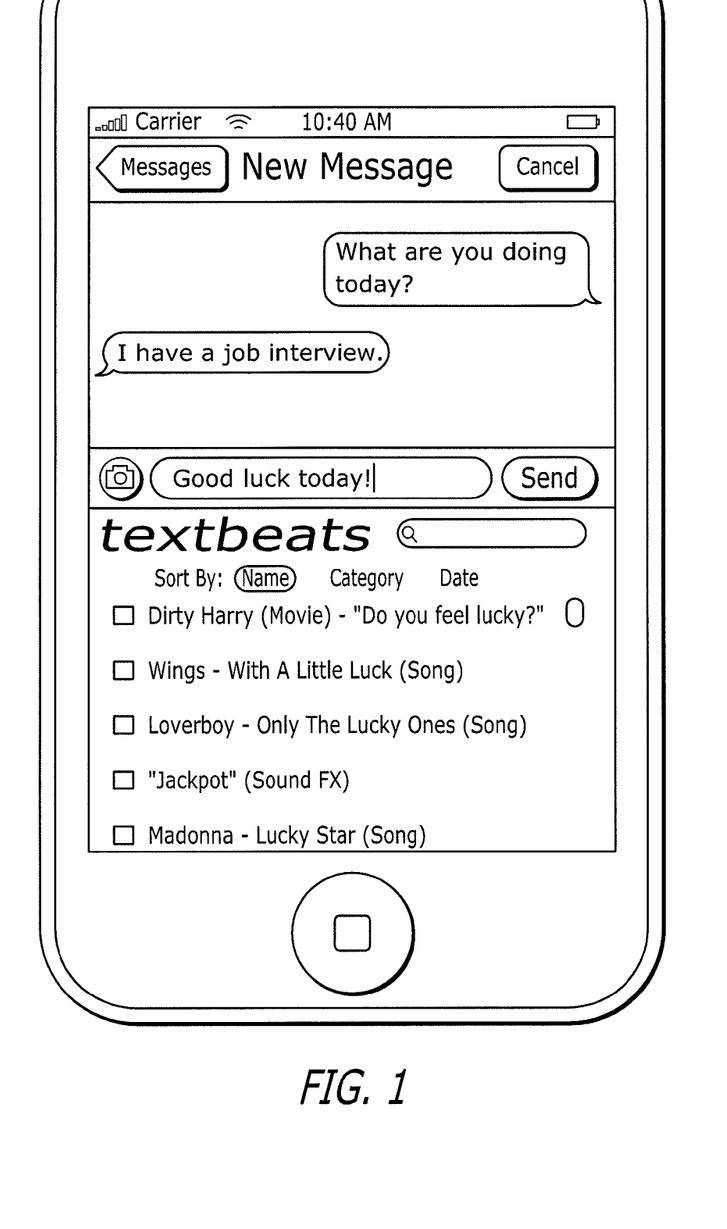
FIG. 1 is an illustration of a trading of messages where the answer by the recipient generates creation of a menu of audio and/or video content relating to the answer by the recipient.
Figure 8:
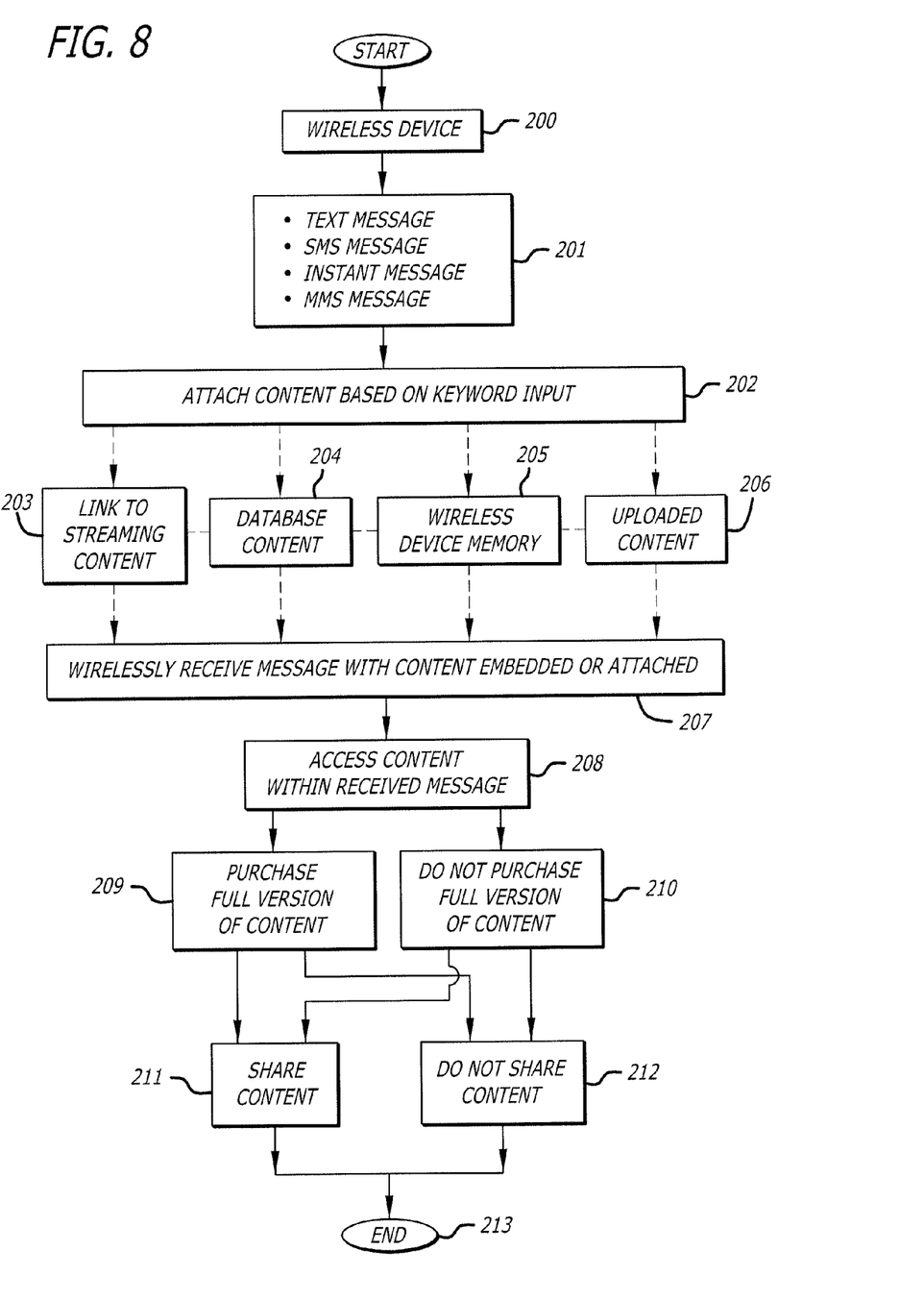
FIG. 8 is an illustration schematic block diagram of an alternative embodiment of the system of FIG. 1.

FIG. 8 is a schematic illustration of an alternative embodiment of the system of FIG. 1. Here, a wireless device 200, which may be any suitable message initiator, transmits a text message, an SMS message, an instant message or an MMS message (block 201) which system, as indicated in block 202, selects a keyword input at block 201, and selects content related to said keyword. There may be a link of streaming content (block 203) associated with block 202. There may be a data base content source 204 associated with block 202. Wireless device memory 205 may be associated with block 202. Uploaded content, as indicated at block 206, may be associated with block 202.

The system of FIG. 8 provides for the wirelessly received message with the content embedded or attached from block 202 be received at block 207. Block 207 is also associated with blocks 203, 204, 205 and 207.

The content within the received message from block 207 is accessed at block 208 and transmitted to the user, who can either purchase the full version of the content, indicated by block 209, or not purchase the full version as indicated at block 210.

The user may decide to share the content at full version purchase indicated in block 209 (see block 211) or not share the purchased full version (see block 212). The user may also decide not to purchase the full version but share the clip, as indicated at block 211, or not share the clip (see block 212). The process of the system of FIG. 8 ends (see block 213).

The key word or key words that are input in the body of the text message through a first mobile user's interface will access a database that will provide a select list of audio and/or video recordings based on the first mobile device user's text message content typed in by the first mobile device user (and second or group of users if the system is installed on their wireless device) and includes a list of audio and video recordings. The method and system herein attaches and embeds the selected audio and/or video recording within the text message from the first mobile device user and sends it to a receiving (second) mobile device. The audio or video file may be accessed and uploaded into the text message or instant message or the audio or video file may be a attached as a link to the audio or video that is streamed from the server to the wireless device from the receiving device or group of devices.

The database contains a library of audio and video recordings that are categorized by key words that directly relate to the title of an audio or video recording or key words from within the body of work within the audio or video recording, each of which are associated with titles, lyrics or exact text associations to key words contained within an audio or video recording, such as "touch", "leave", "care", "kiss", and such. For example; a first mobile device user types a text message saying, "I want to kiss you". The user's mobile device accesses the requesting source MTSD database or may access audio or video files stored in memory within the device such as iTunes (may access a plurality of data sources simultaneously) or other downloaded or cloud connected content libraries as known in the art and a list of audio recordings or video recordings appear in the mobile device display with the following options:

"I Want To Kiss You" by Devin
"I Want to Kiss You" by Laurelyn Carter
"I Want to Kiss You" by Edward O'Connell
(I Want To) Kiss You All Over" by Dirt Merchants
"Kiss You All Over" by Exile A first mobile device user selects a preferred recording title from the requesting MTSD source and it facilitates the selection and embeds or creates a link to be able to stream the recording into the specified message to be sent to the receiving device (second mobile device or group of devices) in cooperation with the audio and/or video recording.

In some of the embodiments, the order of the audio or video recording content may be derived from random selection, a pre-designated order, on a pay-for-position order or some other designation format.

In some of these embodiments, the message includes text, an audio recording and/or a video recording. And in other embodiments, the software is able to cause the computer to provide a user interface that can facilitate specific requirements of the message.

In various preferred embodiments, the invention further includes media containing the database containing a plurality of audio and video recordings associated with selectable exact key word or key words categories.

Another general aspect of the present invention is to utilize the MTSD System to send a transmission of a text message that includes embedded audio or video content from a cloud-based computer-implemented system to a first mobile device, second mobile device or a group of mobile devices having a unique context identification number In preferred embodiments, utilization of the MTSD System to send a wireless transmission in response to a text message that is received and includes embedded or links that may include streaming audio or video content direct to a first, second or a group of wireless mobile device communication from a (MTSD) database containing automated answers to a plurality of questions asked by a text message or instant message user that is catalogued by specific categories or individuals such as Presidents, Dignitaries, Professional Athletes, Celebrities, Character's or other persons, whether animated, living or deceased all based on key words.

Reference is made to FIGS. 1 to 7 as an example of how to carry out the teachings of the invention. FIG. 1 shows the face of a mobile phone with an inquiry made by the first user of a phone ("What Are You Doing Today?") to a recipient. User of the other phone (recipient) answers: "I have a job interview," (shows up on first phone—FIG. 1). The sender decides to answer "Good luck today!" Based on this input, the system searches the database and selects 5 audios and/or videos relating to the concept of "Lucky". The user of the first phone selects one of the 5 listed in the menu. The selected audio/video shows up on the sender's phone (FIG. 2) where the sender has various options as shown. One of the options is to attach and send the selection; another is to Try Another Clip.

Figure 2:
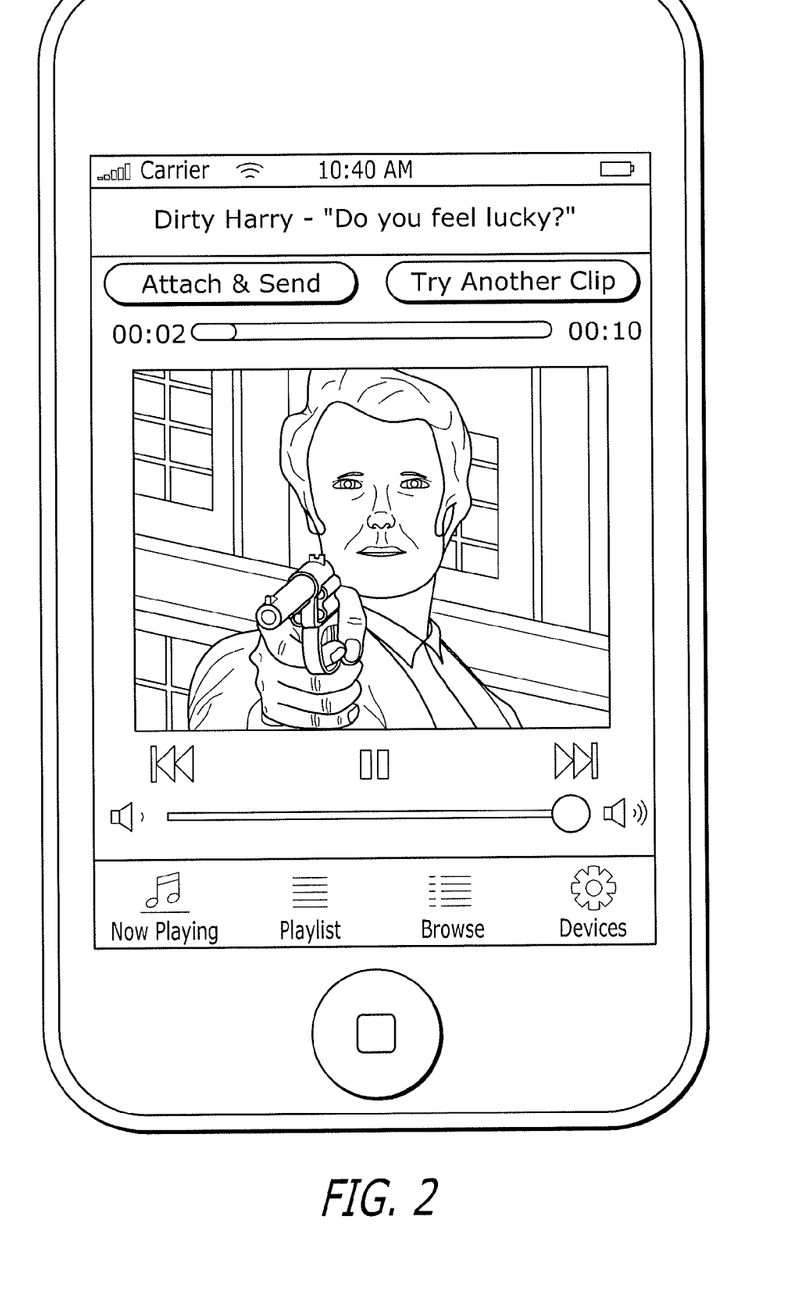
FIG. 2 is an illustration of one of the menu selections of FIG. 1 which can be attached and sent to the recipient.
Figure 3:
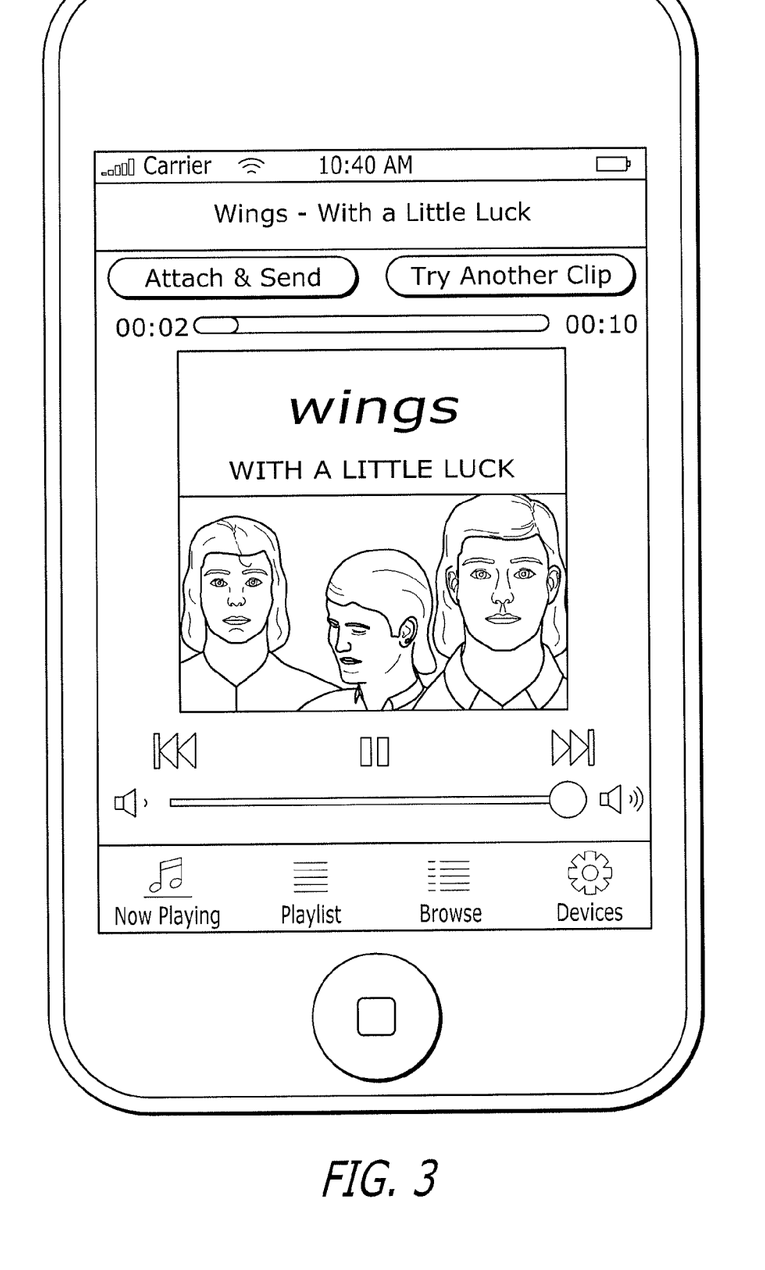
FIG. 3 is an illustration of an alternate menu selection which can be attached and sent to the recipient.

In this case, the sender selects the alternate audio/video clip shown in FIG. 3 (not shown is what happens when "Try Another Clip" is selected in FIG. 2—the menu of FIG. 1 is re-displayed allowing the alternate selection).

Figure 4:
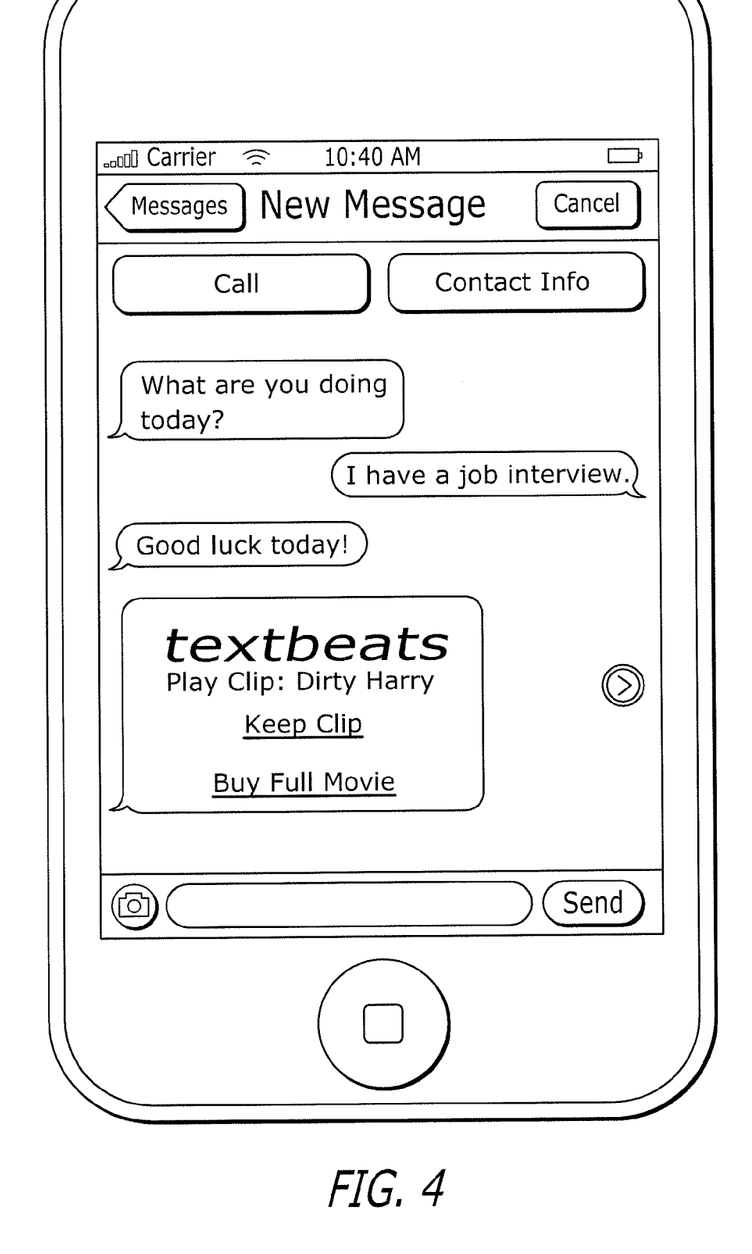
FIG. 4 is an illustration of the recipient's receipt of the menu selection of FIG. 2 enabling the recipient to play the audio and/or video clip.
Figure 5:
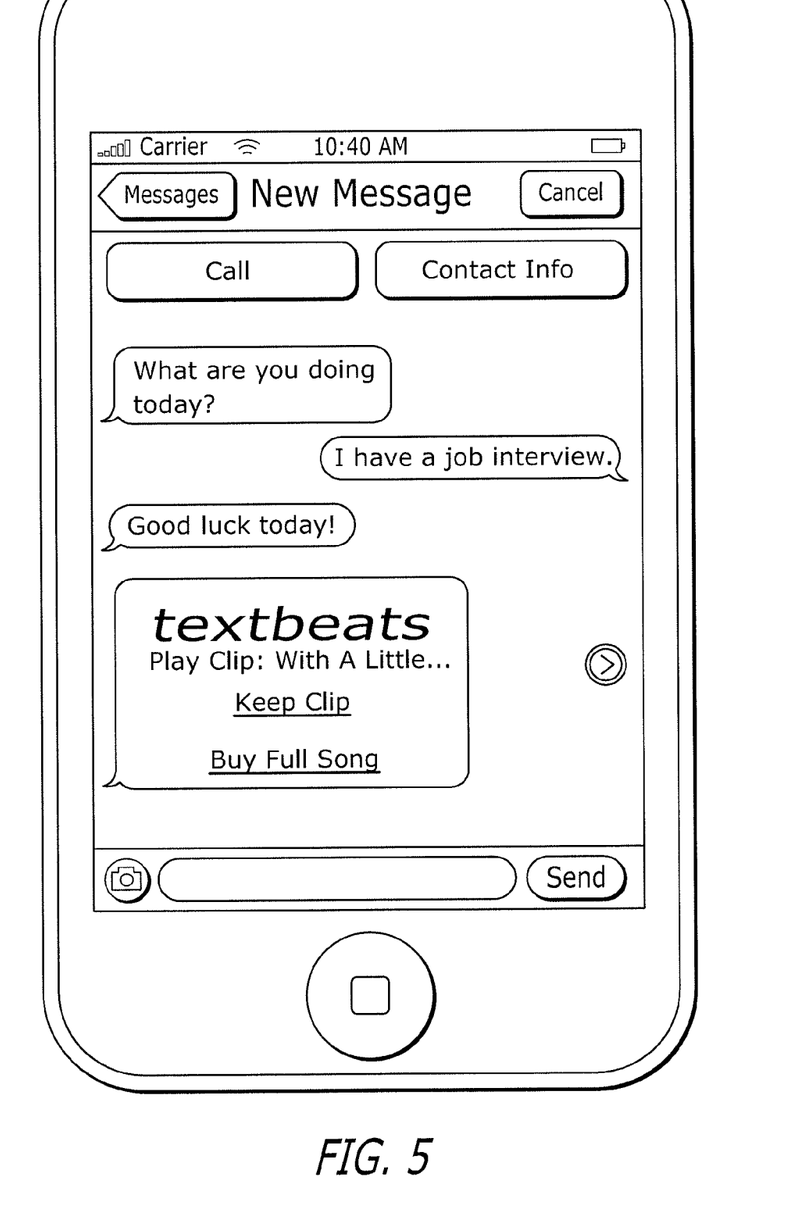
FIG. 5 is an illustration of the recipient's receipt of the menu selection of FIG. 3 enabling the recipient to play the audio and/or video clip.

FIG. 4 shows the face of the recipient's cell phone where he or she sees the message "Good Luck Today!" and can play the selected audio/video clip of FIG. 2. FIG. 5 is similar to FIG. 4 and displays the alternate selection.

Figure 6:
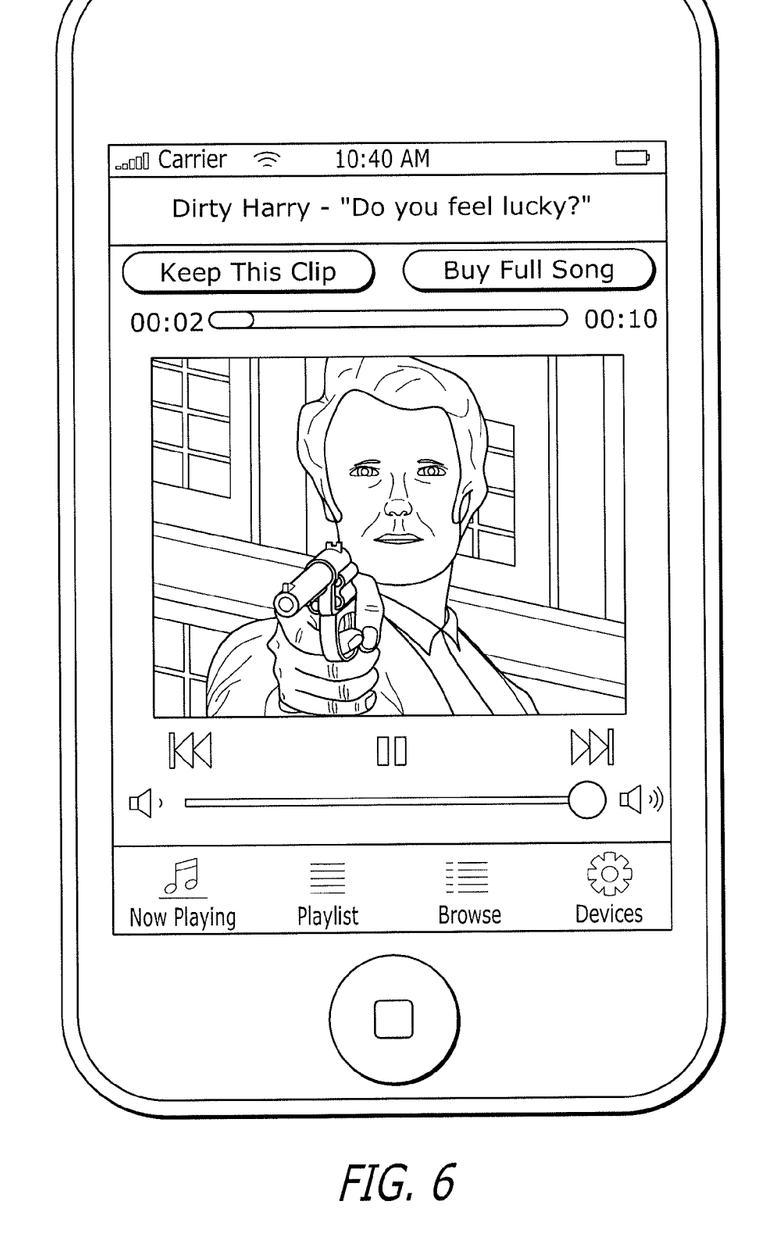
FIG. 6 is an illustration of the recipient's choices for either keeping the clip of FIG. 4 or purchasing the complete movie relating to the clip.
Figure 7:
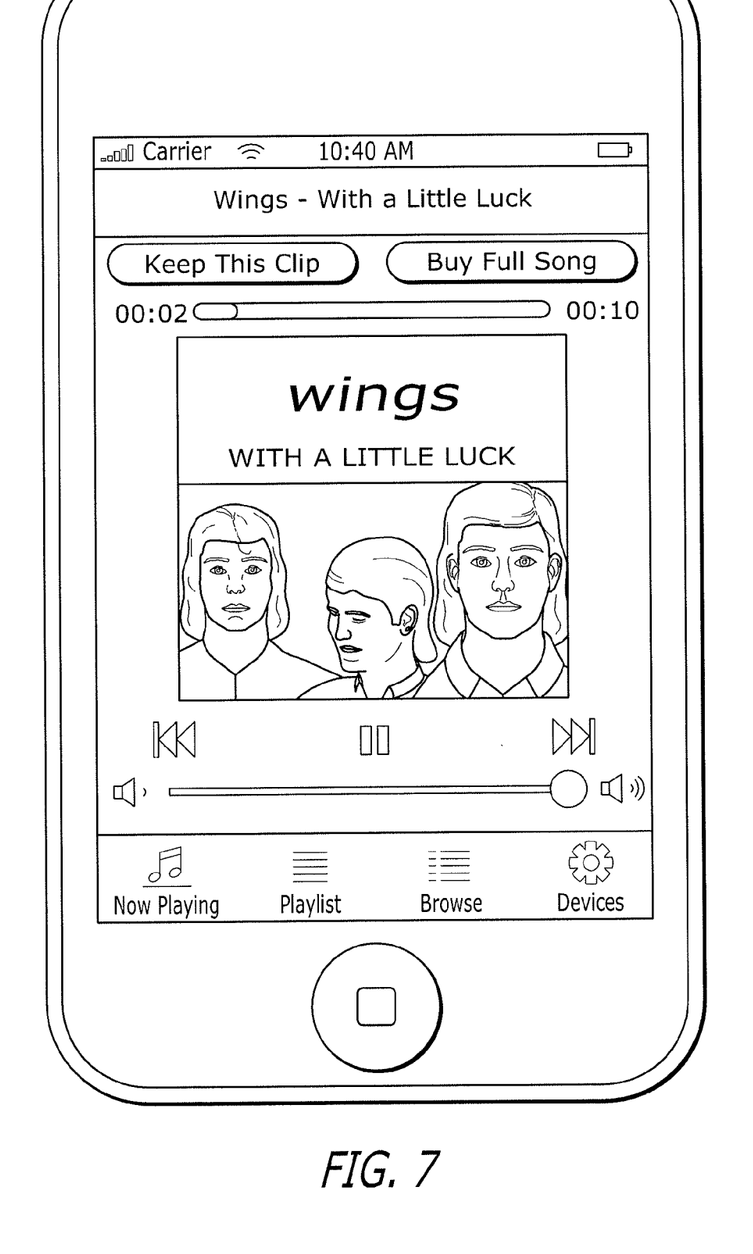
FIG. 7 is an illustration similar to FIG. 6 where the recipient has the choice of keeping the alternate audio and/or video clip of FIG. 5 or purchasing the complete song relating to the audio and/or video clip.

In FIG. 6, the recipient has the option to keep the clip shown in FIG. 4 or buy the full movie from which it came. FIG. 7 is similar to FIG. 6 showing the alternate selection where the recipient can keep the clip or buy the full song.

"Clip" as used herein can be an audio clip, a video clip, sound effect clip, or a combination of audio and video.

Thus, there is disclosed a text messaging and instant messaging computer-implemented system and method for providing embedded multi-element (text message and the inclusion of any audio recorded or video recorded) content by authenticating a wireless device compatible with multiple transport technologies (such as cellular networks, satellite networks, cloud based networks, internet networks, Bluetooth networks, near field communication networks or any other peer to peer network as used in the art) and operable to render a text message with an integrated audio or video embedded message or a link that connects to a streaming audio or video file within a text message originating from a first mobile device, second mobile user, a group of mobile users, Instant Messaging, SMS (Short Message Service) or MMS (Multimedia Message Service) in a manner consistent with the capabilities of the recipient device (second mobile device). The system and method includes: transmission of a text message that includes embedded audio and/or video content having a context identification number from a first mobile device to a second mobile device. This may include a mobile station (MS) receiving a wireless message. A judgment may be made whether the received message is a general SMS message or a SMS message for a MMS. The message may be directly stored if the received message is a general SMS message. The recipient may then be informed of a message reception.

The message initiator may also begin the message by utilizing the said method. The audio or video content may be accessed through the content that is stored on the wireless device or through a remote cloud or internet connected database.

In various preferred embodiments, the first authenticating is provided at a mobile device compatible with multiple transport technologies (such as 4G and 5G networks) and operable to render an integrated audio or video embedded message within a text message originating from a first mobile device. A second mobile device is enabled to respond to the first device message and an instant response will be provided based on the content of the message sent.

Although the terms text messages and instant messages have been used, the system and method disclosed herein can be used to decode and/or encode and transmit any suitable communication by any suitable means.

Although a particular embodiment of the invention is disclosed, variations thereof may occur to an artisan and the scope of the invention should only be limited by the scope of the appended claims.

The invention claimed is:

1. A method for incorporating multi-media content into a text-based message, the method comprising the actions of:
   identifying keywords within content of at least a portion of a text message existing on a wireless device and intended to be transmitted to another device;
   maintaining a database of multi-media content items, wherein the multi-media content items are organized into categories based on keywords that exist in the title or content such multi-media content items;

searching the database for multi-media content items related to one or more keywords in the content of the text message;

presenting a plurality of multi-media content menu items on a user interface of the wireless device such that at least one of the multi-media content menu items can be selected, wherein each of the plurality of multi-media content menu items is associated with a multi-media content item and each such multi-media content item is related to at least one or more of the keywords in the content of the text message;

receiving a selection of at least one of the plurality of multi-media content menu items;

presenting the multi-media content item associated with the selected multi-media content menu item to the user in an interface to allow the user to play the multi-media content item and/or to try another multi-media content item;

presenting a selectable option on the user interface to enable a user to select only a clip from a multi-media content item associated with the selected multi-media content item identifier or to purchase the entire multi-media content item;

upon receiving a selected option to select only a clip from the multi-media content item, including an access element within the content of the text message, the access element being related to the selected multi-media content item clip;

upon receiving a selected option to select the entire multi-media content item, including an access element within the content of the text message, the access element being related to the selected entire multi-media content item; and further comprising the action of sending the text message with the included access element to the other device and including within the text message a selectable option for the recipient to render the multi-media content item clip or to purchase the full multi-media content element.

2. A system for incorporating multi-media content into a text-based message, the system comprising:

a memory element configured to maintain the storage of instructions; and a processor, coupled to the memory element, that facilitates execution of the instructions to perform operations comprising:

identifying keywords within content of at least a portion of a text message existing on a wireless device and intended to be transmitted to another device;

maintaining a database of multi-media content items, wherein the multi-media content items are organized into categories based on keywords that exist in the title or content of such multi-media content items;

searching the database for multi-media content items related to one or more keywords in the content of the text message;

presenting a plurality of multi-media content menu items on a user interface of the wireless device such that at least one of the multi-media content menu items can be selected, wherein each of the plurality of multi-media content menu items is associated with a multi-media content item and each such multi-media content item is related to at least one or more of the keywords in the content of the text message;

receiving a selection of at least one of the plurality of multi-media content menu items;

presenting the multi-media content item associated with the selected multi-media content menu item to the user in an interface to allow the user to play the multi-media content item and/or to try another item;

presenting a selectable option on the user interface to enable a user to select only a clip from a multi-media content item associated with the selected multi-media content item identifier or to purchase the entire multi-media content item;

upon receiving a selected option to select only a clip from the multi-media content item, including an access element within the content of the text message, the access element being related to the selected multi-media content item clip;

upon receiving a selected option to select the entire multi-media content item, including an access element within the content of the text message, the access element being related to the selected entire multi-media content item; and sending the text message with the included access element to the other device and including within the text message a selectable option for the recipient to render the multi-media content item clip or to purchase the full multi-media content element.

* * * * *